United States Patent
Honda

(10) Patent No.: US 9,452,489 B2
(45) Date of Patent: Sep. 27, 2016

(54) MACHINE AND METHOD FOR ADDITIVE MANUFACTURING

(71) Applicant: JEOL Ltd., Tokyo (JP)

(72) Inventor: Kazuhiro Honda, Tokyo (JP)

(73) Assignee: JEOL Ltd., Tokyo (JP)

( * ) Notice: Subject to any disclaimer, the term of this patent is extended or adjusted under 35 U.S.C. 154(b) by 97 days.

(21) Appl. No.: 14/644,278

(22) Filed: Mar. 11, 2015

(65) Prior Publication Data

US 2015/0306700 A1    Oct. 29, 2015

(30) Foreign Application Priority Data

Mar. 13, 2014   (JP) ................................. 2014-50677

(51) Int. Cl.
| | |
|---|---|
| *B22F 3/105* | (2006.01) |
| *B23K 15/00* | (2006.01) |
| *B33Y 30/00* | (2015.01) |
| *B33Y 10/00* | (2015.01) |
| *B29C 67/00* | (2006.01) |

(52) U.S. Cl.
CPC ......... *B23K 15/0086* (2013.01); *B23K 15/004* (2013.01); *B29C 67/0077* (2013.01); *B33Y 10/00* (2014.12); *B33Y 30/00* (2014.12); *B22F 3/105* (2013.01); *B22F 3/1055* (2013.01); *B22F 2003/1056* (2013.01); *B22F 2202/00* (2013.01); *B22F 2202/11* (2013.01); *B22F 2998/00* (2013.01); *B23K 15/00* (2013.01)

(58) Field of Classification Search
CPC  B22F 3/105; B22F 2202/00; B22F 2202/11; B22F 2998/00; B23K 15/00; B23K 15/0086; B23K 26/34; B23K 26/342
USPC .......... 219/121.12–121.17, 121.35; 264/424, 264/461, 485; 419/1; 156/272.2
See application file for complete search history.

(56) References Cited

U.S. PATENT DOCUMENTS

| | | | | |
|---|---|---|---|---|
| 3,663,794 A | * | 5/1972 | de Cachard | ........ B23K 15/0053 219/121.14 |
| 2002/0079463 A1 | * | 6/2002 | Shichi | ................ B23K 15/0006 250/492.1 |
| 2014/0196618 A1 | * | 7/2014 | Pervan | ........................ B41J 3/28 101/32 |

FOREIGN PATENT DOCUMENTS

| | | |
|---|---|---|
| JP | 2010526694 A | 8/2010 |
| WO | 2008147306 A1 | 12/2008 |

* cited by examiner

*Primary Examiner* — Samuel M Heinrich
(74) *Attorney, Agent, or Firm* — The Webb Law Firm

(57) ABSTRACT

A machine and method for additive manufacturing is offered which can eliminate static electricity of a powdered material without using an inert gas to thereby prevent scattering of the material. The additive manufacturing machine (1) has a support stage (4), a first electron gun (8), and a second electron gun (9). The first electron gun (8) melts a given region of the powdered material (M1). The second electron gun (9) illuminates the surface of a given region formed by the powdered material spread tightly on the stage (4) with an electron beam (L2) that is tilted relative to the surface to eliminate static electricity of the powdered material (M1).

5 Claims, 5 Drawing Sheets

MACHINE AND METHOD FOR ADDITIVE MANUFACTURING

BACKGROUND OF THE INVENTION

1. Field of the Invention

The present invention relates to a machine and method for 'additive manufacturing', fabricating a three-dimensional object by spreading a powdered material on a support stage to form a thin layer of the powdered material and stacking such layers on top of each other.

2. Description of Related Art

In recent years, techniques for fabricating a three-dimensional (3D) object by spreading a powdered material to form a thin layer and stacking such layers on top of each other have attracted lots of attention, and many kinds of additive manufacturing techniques have been developed using different powdered materials and different additive manufacturing procedures (see, for example, JP-A-2010-526694).

FIG. 4 is a schematic cross section of a related art additive manufacturing machine, 100. The additive manufacturing machine 100 spreads a metal powder M1 tightly on the top surface of a powder support stage 104 using a powder feeder 107 to form one layer. Then, only a two-dimensional structural portion of the metal powder M1 which has been spread tightly on the stage 104 and which corresponds to one cross section of a three-dimensional object P1 to be created is melted with an electron beam. The three-dimensional object is built by stacking such layers of the metal powder M1 on top of each other in the direction of height (in the Z-direction).

As shown in FIG. 4, the additive manufacturing machine 100 has an electron gun 108 mounted in the top of a vacuum vessel 102. A cylindrical additive manufacturing platform 103 is mounted inside the vacuum vessel 102. An electron beam controller 111 for controlling the electron gun 108 is connected with the electron gun 108. The platform 103 is centrally provided with a pit 103a. A drive mechanism 105 by which the stage 104 is movably supported is mounted below the pit 103a. The support stage 104 has a shaft portion 104d to which the drive mechanism 105 is coupled to drive the stage 104 in the vertical direction. The interior of the vacuum vessel 102 is maintained at a vacuum.

The support stage 104 is placed by the drive mechanism 105 at a position that is lower than the top surface of the additive manufacturing platform 103 by a distance of ΔZ. The metal powder M1 is spread tightly up to a thickness equal to the distance ΔZ on the stage 104 by the powder feeder 107.

A previously prepared, designed three-dimensional model is sliced into multiple two-dimensional shapes which are spaced from each other at intervals of ΔZ. In conformity with one of the two-dimensional shapes, an electron beam L1 is directed from the electron gun 108 at the metal powder M1. The region of the metal powder M1 conforming to the two-dimensional shape is molten by the electron beam L1 emitted from the electron gun 108. When a given time according to the material elapses, the molten metal powder M1 solidifies. After one layer of metal powder M1 is melted and solidified, the support stage 104 is lowered an incremental distance equal to ΔZ by the drive mechanism 105. Then, an amount of the metal powder M1 for achieving a thickness of ΔZ is spread tightly on the lower layer formed immediately previously. The region of the metal powder M1 corresponding to the two-dimensional shape corresponding to this layer is illuminated with the electron beam L1 to melt and solidify the metal powder M1. This series of steps is repeated to stack layers of the melted and solidified metal powder M1 on top of each other, thus creating a three-dimensional object.

FIG. 3A schematically shows the state of electrons when the metal powder M1 is illuminated with the electron beam L1. However, with the additive manufacturing machine 100 shown in FIG. 4, when the electron beam L1 impinges substantially perpendicularly on the sample surface, most of the impinging electrons penetrate into the sample surface and diffuse into the sample layer located under the metal powder M1 spread tightly as shown in FIG. 3A. Some electrons stay in the metal powder M1. Where the metal powder M1 is an insulator, the metal powder M1 is negatively charged by the electron beam L1. Even where the metal powder M1 is a conductor, if the grains of the powder each have a small ground contact area, are spherical in shape, and make a point contact with each other, then the powder is negatively charged in the same way as for an insulator, because the amount of current of the electron beam L1 is large. Therefore, as shown in FIG. 5, the negatively charged grains of the metal powder M1 repel each other. This creates the danger that the powder M1 will be scattered.

In order to prevent the metal powder M1 from being negatively charged and scattering, it is conceivable to mount a gas introduction device 112 on the vacuum vessel 102 to introduce an inert gas F1 for neutralizing the charged metal powder M1 as shown in FIG. 4. When the inert gas F1 is introduced, however, the energy of the electron beam L1 emitted from the electron gun 108 is scattered and lost, thus presenting the problem that the metal powder M1 is not melted. Another problem is that the inert gas F1 adheres to the electron gun 108, shortening the lifetime of the gun 108.

SUMMARY OF THE INVENTION

In view of the foregoing problems, it is an object of the present invention to provide a machine and method for additive manufacturing capable of eliminating static electricity of a powdered material without using an inert gas and of preventing scattering of the powdered material.

An additive manufacturing machine which solves the foregoing problems and achieves the above-described object of the invention has a support stage, a first electron gun, and a second electron gun. A powdered material for creating a three-dimensional (3D) object is spread tightly on the support stage. The first electron gun emits an electron beam at a given region of the powdered material that has been spread tightly on the support stage to melt the given region of the material. The second electron gun emits an electron beam at a sample surface formed by the powdered material spread tightly while the beam is tilted relative to the sample surface. Thus, static electricity on the powdered material is eliminated.

An additive manufacturing method according to the present invention includes the following steps: (1) spreading a powdered material for creating a three-dimensional object tightly on one surface of a support stage; (2) illuminating a given region of the powdered material spread tightly on the support stage with an electron beam from a first electron gun to melt the given region of the powdered material; and (3) directing a second electron beam from a second electron gun different from the first electron gun at a sample surface formed by the powdered material spread tightly on the support stage while tilting the second electron beam to eliminate static electricity of the powdered material.

According to the machine and method for additive manufacturing according to the present invention, static electricity on the powdered material can be eliminated by the second electron gun. Consequently, scattering of the powdered material due to static electricity can be prevented.

DESCRIPTION OF THE INVENTION

Figure 1:
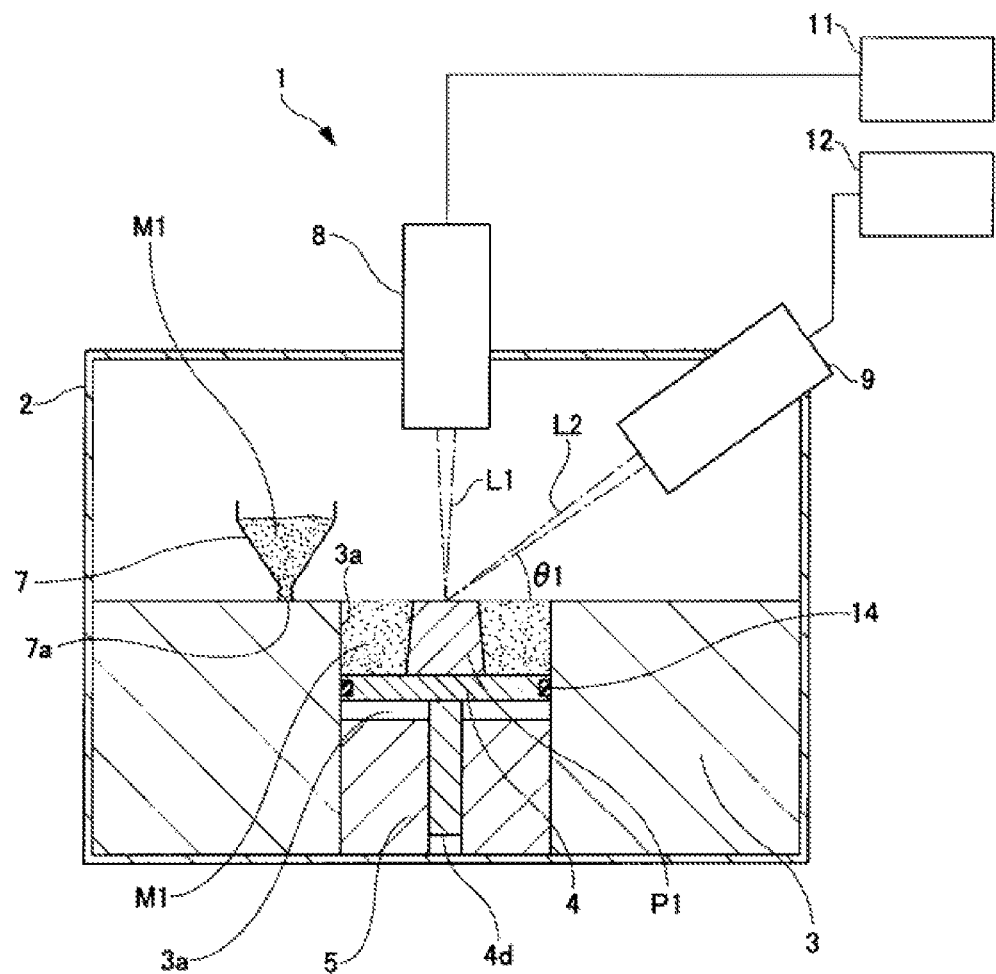
FIG. 1 is a schematic cross-sectional view of an additive manufacturing machine associated with one embodiment of the present invention.

An embodiment of the additive manufacturing machine of the present invention is hereinafter described with reference to FIGS. 1-3. In the various figures, like components are indicated by like reference numerals. Although the various areas of the description are provided in the following order, the invention is not restricted to the following embodiment.

1. Embodiment

1-1. Configuration of Additive Manufacturing Machine

One embodiment of the additive manufacturing machine of the present invention is described by referring to FIG. 1, which schematically shows the machine. The additive manufacturing machine, 1, shown in FIG. 1 is used to fabricate a multilayered three-dimensional object by illuminating a powdered material consisting of a metal powder of titanium, aluminum, iron, or other metal with an electron beam to melt the powdered material and stacking layers of the solidified powdered material on top of each other.

The additive manufacturing machine 1 has a hollow vacuum vessel 2, an additive manufacturing frame 3, a support stage 4, a mechanical drive 5 by which the stage 4 is movably supported, a powder feeder 7 for supplying the metal powder M1 that is one example of powdered material onto the support stage 4, a first electron gun 8, and a second electron gun 9. Furthermore, the additive manufacturing machine 1 has a first electron beam controller 11 for controlling the first electron gun 8 and a second electron beam controller 12 for controlling the second electron gun 9.

A vacuum pump (not shown) is connected with the vacuum vessel 2. The interior of the vacuum vessel 2 is maintained at a vacuum by evacuating the vacuum vessel 2 using the vacuum pump. The additive manufacturing frame 3, support stage 4, drive mechanism 5, and powder feeder 7 are mounted in the vacuum vessel 2.

The additive manufacturing frame 3 is disposed in a lower part of the vacuum vessel 2. The frame 3 is provided with a pit 3a extending vertically through the frame. The pit 3a has an opening shaped like a square pole. A part of the outer periphery of the pit 3a is open to permit the completed 3D object P1 to be taken out.

The support stage 4 and drive mechanism 5 are disposed in the pit 3a of the additive manufacturing frame 3. The support stage 4 is shaped like a flat plate. The metal powder M1 for creating the 3D object P1 is stacked as layers on the stage 4. A seal member 14 having heat resistance and flexibility is attached to the outer end of the stage 4. The seal member 14 is slidably in contact with the wall surface of the pit 3a. A space formed vertically below the stage 4 and a space formed vertically above the stage 4 are hermetically closed by the seal member 14.

A shaft 4d is mounted on the other surface of the support stage 4 which faces away from the surface on which the metal powder M1 is spread as layers. The shaft 4d protrudes vertically downwardly from the other surface of the support stage 4. The shaft 4d is connected with the drive mechanism 5, which in turn drives the support stage 4 in the vertical direction via the shaft 4d. Examples of the drive mechanism 5 include a rack and pinion and a ball screw.

The powder feeder 7 is disposed over the additive manufacturing frame 3. The metal powder M1 is fed out into the powder feeder 7 from a metal powder vat (not shown) via a feeding tube. The powder feeder 7 has an exhaust port 7a in its bottom. The metal powder M1 is expelled from the exhaust port 7a of the powder feeder 7 such that the powder M1 is spread tightly over one whole surface of the support stage 4. A leveling plate for leveling off the metal powder M1 supplied onto one surface of the support stage 4 may be mounted in the vacuum vessel 2.

The mechanism for supplying the metal powder M1 onto one surface of the support stage 4 is not restricted to the foregoing mechanism. For example, the metal powder M1 previously supplied in the vacuum vessel 2 may be conveyed to the support stage 4 via an arm member in the form of a flat plate and spread tightly over one surface of the stage 4.

The first electron gun 8 and the second electron gun 9 are mounted in an upper part of the vacuum vessel 2 and face one surface of the support stage 4. The first electron gun 8 emits a melting electron beam L1 at a given region of the metal powder M1 spread tightly over one surface of the stage 4 to melt this region of the powder M1. The first electron gun 8 is connected with a first electron beam gun controller 11 that determines the output value of the melting electron beam L1 emitted from the first electron gun 8 and the position on the metal powder M1 hit by the melting electron beam L1. The beam controller 11 outputs information about the determined output energy value and position to the first electron gun 8 and activates the gun 8.

The second electron gun 9 emits an electron beam L2 at the whole metal powder M1 spread tightly over one surface of the support stage 4 to neutralize static electricity on the powder, thus removing static electricity on the powder M1. The second electron gun 9 is connected with the second electron gun controller 12, which determines the output value of the static electricity neutralizing electron beam L2 and the position on the powder hit by the second electron beam L2. The second electron beam controller 12 outputs information about the determined output energy value and position to the second electron gun 9 and activates the gun 9.

The second electron gun 9 emits the static electricity neutralizing electron beam L2 while the beam is tilted at a given angle $\theta 1$ relative to a plane (hereinafter referred to as the sample surface) formed by the metal powder M1 that is spread tightly over one surface of the support stage 4. The tilt angle θ1 is set to about 45 degrees or less, for example, relative to the sample surface. The output of the neutralizing electron beam L2 from the second electron gun 9 is set lower than the output of the melting electron beam L1 from the first electron gun 8. The output energy of the melting electron beam L1 and the output energy of the neutralizing electron beam L2 are set, for example, to 60 kV and 1 kV, respectively.

Figure 2:
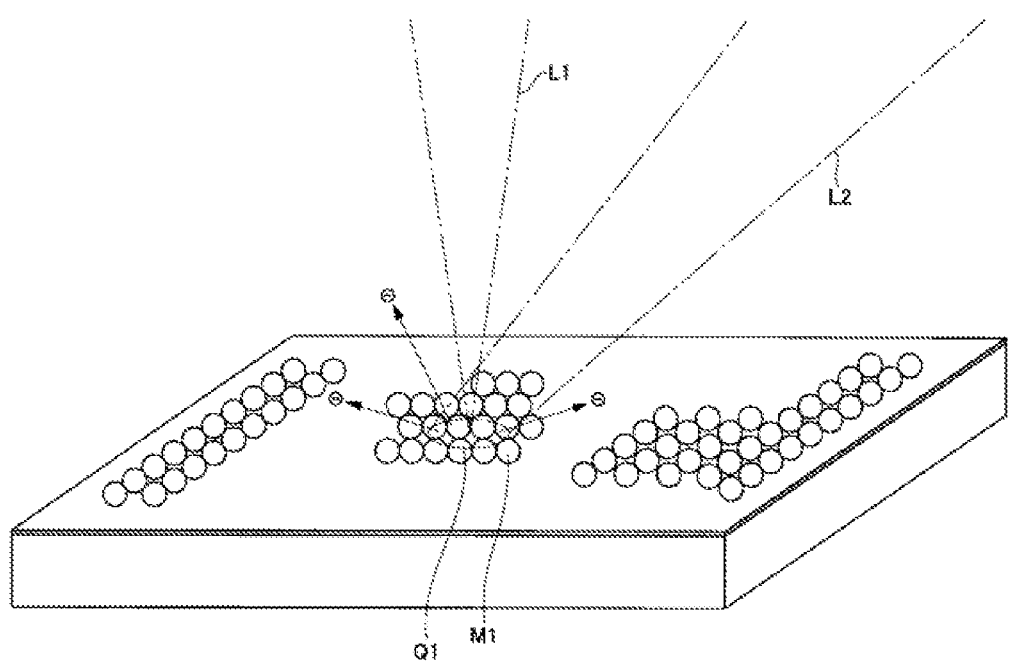
FIG. 2 is a fragmentary perspective view of the additive manufacturing machine shown in FIG. 1, showing the manner in which electron beams are emitted from first and second electron guns.

FIG. 2 schematically shows the manner in which the melting electron beam L1 and the static electricity neutralizing electron beam L2 are emitted. A position Q1 on the powder is hit by the melting electron beam L1 emitted from the first electron gun 8. The same position Q1 is also hit by the static electricity neutralizing electron beam L2 emitted from the second electron gun 9. The neutralizing electron beam L2 is emitted at a tilt to the sample surface. Therefore, the diameter of the spot formed by the neutralizing electron beam L2 can be made larger than the diameter of the spot formed by the melting electron beam L1.

1-2. Operation of Additive Manufacturing Machine

The operation of the additive manufacturing machine 1 having the above-described configuration is next described by referring to FIGS. 1 and 2. FIG. 2 schematically illustrates the principal operation of the additive manufacturing machine 1.

First, as shown in FIG. 1, the sample stage 4 is placed by the drive mechanism 5 at a position that is shifted vertically downwardly from the top surface of the additive manufacturing frame 3 by ΔZ that is equal to the vertical thickness of the metal powder M1 subsequently spread tightly. Then, the powder feeder 7 spreads the metal powder M1 over one whole surface of the support stage 4 up to the thickness ΔZ.

When the step of spreading the metal powder M1 tightly is complete, the melting electron beam L 1 is emitted at the metal powder M1 from the first electron gun 8. In particular, the first electron gun 8 emits the melting beam L1 at the metal powder M1 in accordance with each two-dimensional shape of the slices obtained by slicing a previously prepared design object at intervals of ΔZ, the design object being represented by three-dimensional CAD (computer-aided design) data. As a result, a region of the metal powder M1 corresponding to the two-dimensional shape is molten.

At this time, the second electron gun 9 emits the static electricity neutralizing electron beam L2 at the same position hit by the melting beam L1 emitted from the first electron gun 8. The beams L1 and L2 scan the given region of the metal powder M1 while being synchronized with each other. The spot of the melting beam L1 is included within the spot of the neutralizing beam L2. That is, the step of emitting the melting electron beam L1 and the step of emitting the static electricity neutralizing electron beam L2 are performed at the same time.

Figure 3A:
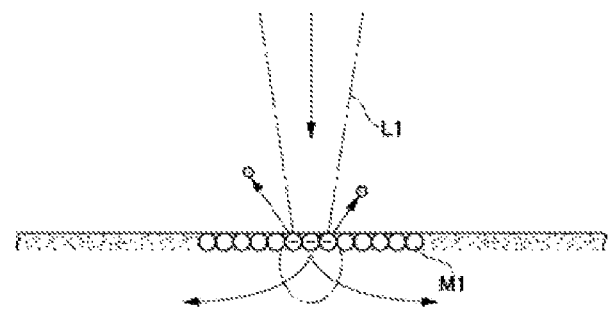
FIGS. 3A-3C are schematic cross-sectional views showing various manners in which the electron beams from the first and second electron guns shown in FIG. 2 impinge on a sample surface.
Figure 3B:
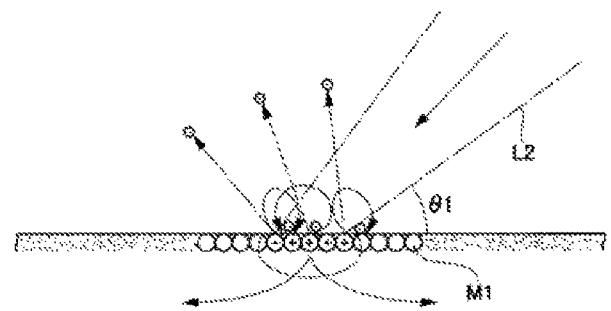
Figure 3C:
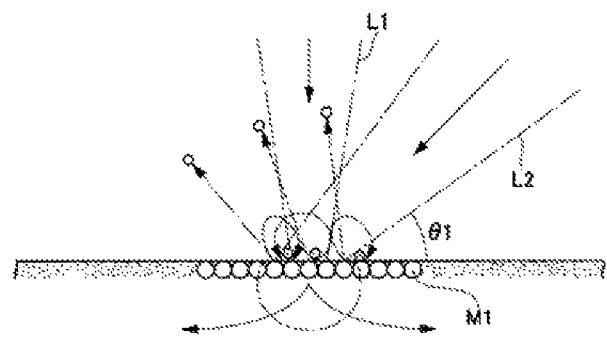
Figure 4:
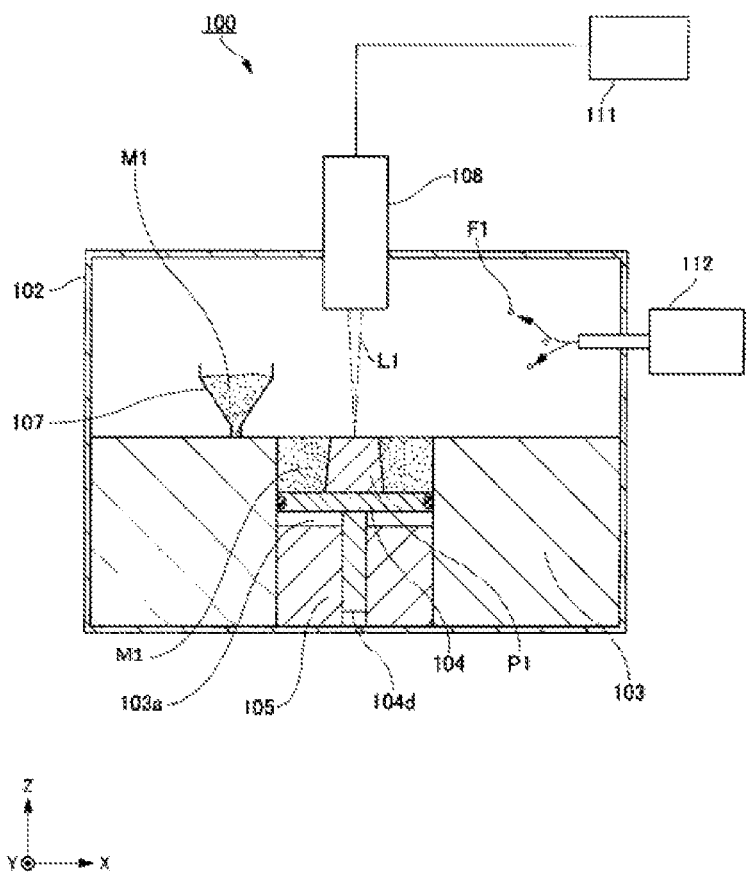
FIG. 4 is a schematic cross-sectional view of a related art additive manufacturing machine.
Figure 5:
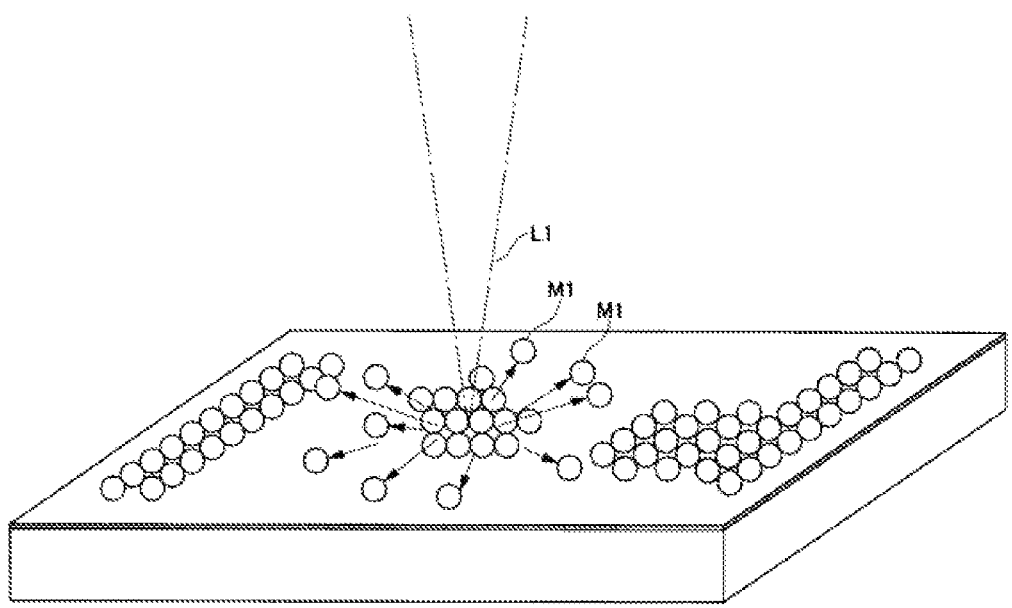
FIG. 5 is a fragmentary perspective view of the related art additive manufacturing machine shown in FIG. 4, showing electron beam illumination.

The advantageous effects of the static electricity neutralizing electron beam L2 are next described by referring to FIGS. 3A-3C. When the electron beam L1 impinges substantially normally on the sample surface as shown in FIG. 3A, the metal powder M1 is negatively charged as described previously. The negatively charged grains of the metal powder M1 repel each other as shown in FIG. 5, scattering the metal powder M1.

On the other hand, as shown in FIG. 3B, in the additive manufacturing machine 1 according to the present embodiment, the second electron gun 9 emits the static electricity neutralizing electron beam L2 at the angle θ1 to the sample surface. This neutralizing beam L2 penetrates into the sample surface less deeply than the melting electron beam L1 impinging normally on the sample surface. Furthermore, as described previously, the beam spot formed on the sample surface is larger in diameter than where the electron beam impinges substantially normally on the sample surface. This can extend the range of the metal powder M1 from which secondary electrons are released. Consequently, a greater number of secondary electrons than incident electrons are released from the sample surface. Although the metal powder M1 is temporarily positively charged, the powder is quickly neutralized by the released secondary electrons.

A case in which the melting electron beam L1 and the static electricity neutralizing electron beam L2 hit the powder at the same position is next described by referring to FIG. 3C. As shown in FIG. 3C, the metal powder M1 is negatively charged by the melting electron beam L1 impinging substantially perpendicularly on the sample surface. However, secondary electrons are released from the metal powder M1 owing to the static electricity neutralizing electron beam L2 impinging obliquely on the sample surface. The released secondary electrons are redistributed according to the amount of static electricity on the metal powder M1. Consequently, static electricity of the negatively charged metal powder M1 can be eliminated and the metal powder M1 can be neutralized.

In this way, the additive manufacturing machine 1 of the present embodiment can eliminate static electricity of the metal powder M1 without using an inert gas by emitting the static electricity neutralizing electron beam L2 from the second electron gun 9 while tilting the beam relative to the sample surface. As a result, scattering of the metal powder M1 due to negative charging of the metal powder M1 can be prevented. Furthermore, it is not necessary to introduce an inert gas into the vacuum vessel 2, thus preventing attenuation of the energy of the melting electron beam L1 emitted from the first electron gun 8.

The molten metal powder M1 solidifies when a given time according to the material elapses. After one layer of metal powder M1 melts and solidifies, the support stage 4 is lowered an incremental distance of ΔZ by the drive mechanism 5. This motion of the stage 4 in the Z-direction is permitted by sliding motion of the seal member 14 along the inner surface of the pit 3a in the additive manufacturing frame 3.

The metal powder M1 is again spread tightly up to a height of ΔZ by the powder feeder 7 on the lower layer formed immediately previously. A region of the metal powder M1 conforming to the two-dimensional shape corresponding to this second layer is molten and solidified by the melting electron beam L1 emitted from the first electron gun 8. Furthermore, the second electron gun 9 emits the static electricity neutralizing electron beam L2 at the powder such that the position hit by the melting beam L1 is also hit by the neutralizing beam L2. This series of steps is repeated to stack layers of molten and solidified metal powder M1 on top of each other, thus building the 3D object P1. Thus, the operation of the additive manufacturing machine 1 according to the present embodiment is completed.

It is to be understood that the present invention is not restricted to the embodiment described above and shown in the accompanying drawings and that various modifications are possible without departing from the gist of the present invention set forth in the appended claims.

Having thus described my invention with the detail and particularity required by the Patent Laws, what is desired protected by Letters Patent is set forth in the following claims.

The invention claimed is:

1. An additive manufacturing machine comprising:
   a support stage on which a powdered material for creating a three-dimensional object is spread tightly;
   a first electron gun for emitting an electron beam at a given region of the powdered material spread tightly on the support stage to melt the given region of the powdered material; and
   a second electron gun for emitting a second electron beam at a given region of the surface formed by the powdered material spread tightly on the support stage, the beam of the second electron beam being tilted at a tilt angle relative to the surface to eliminate static electricity of the powdered material.

2. The additive manufacturing machine as set forth in claim 1, wherein the electron beam emitted from said first electron gun and the electron beam emitted from said second electron gun hit the powdered material at the same position.

3. The additive manufacturing machine as set forth in claim 1, wherein said tilt angle at which said second electron gun emits the electron beam at said surface is set to 45 degrees or less relative to the surface.

4. The additive manufacturing machine as set forth in claim 1, wherein said electron beam emitted from said second electron gun is set to have lower output energy than that of the electron beam emitted from said first electron gun.

5. An additive manufacturing method comprising the steps of:
   spreading a powdered material for creating a three-dimensional object tightly on one surface of a support stage;
   illuminating a given region of the powdered material on the support stage with an electron beam emitted from a first electron gun to melt the given region of the powdered material; and
   illuminating a sample surface formed by the powdered material on the support stage with a second electron beam emitted from a second electron gun different from the first electron gun while tilting the second electron beam to eliminate static electricity of the powdered material.

* * * * *